UNITED STATES PATENT OFFICE.

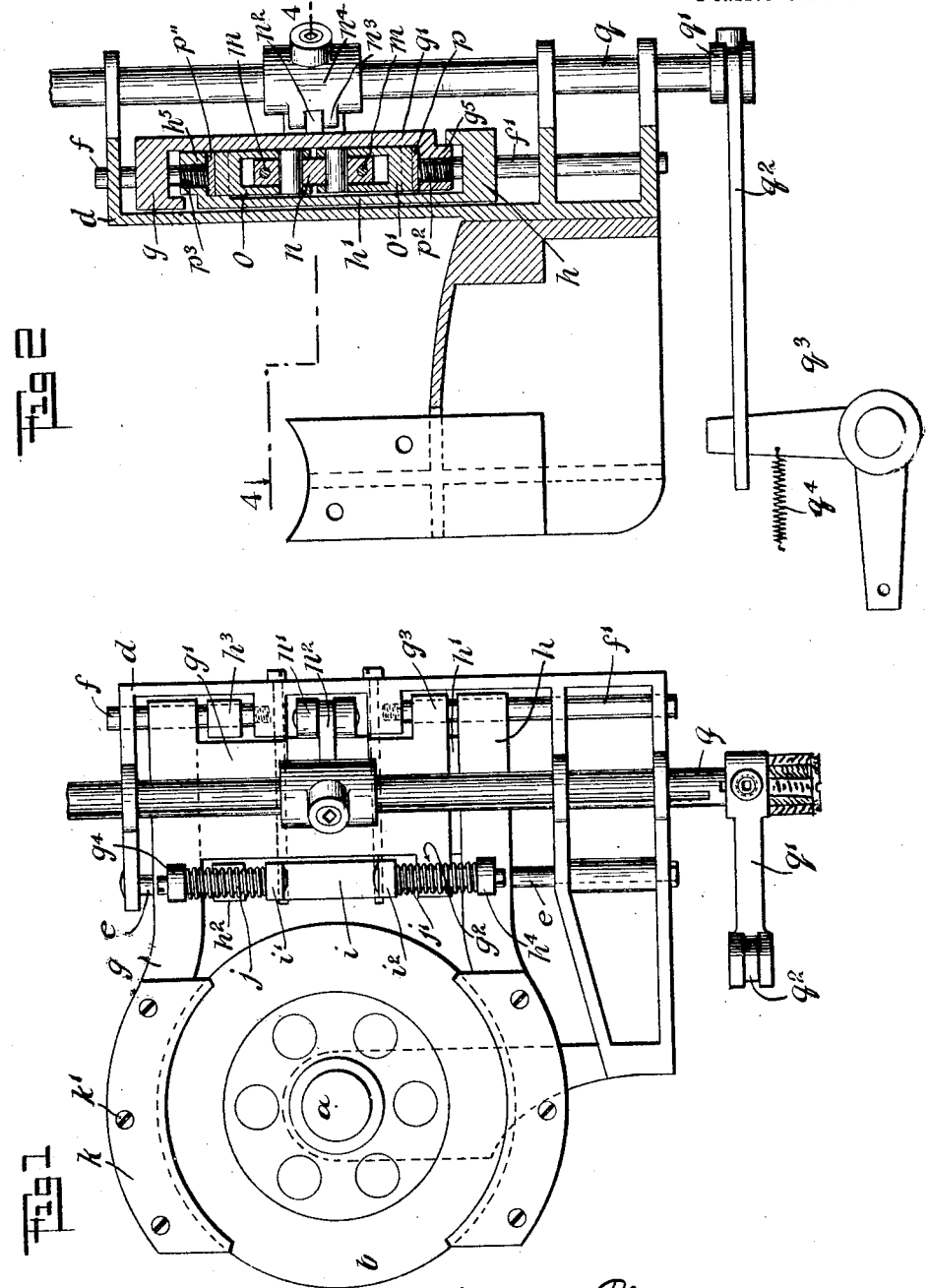

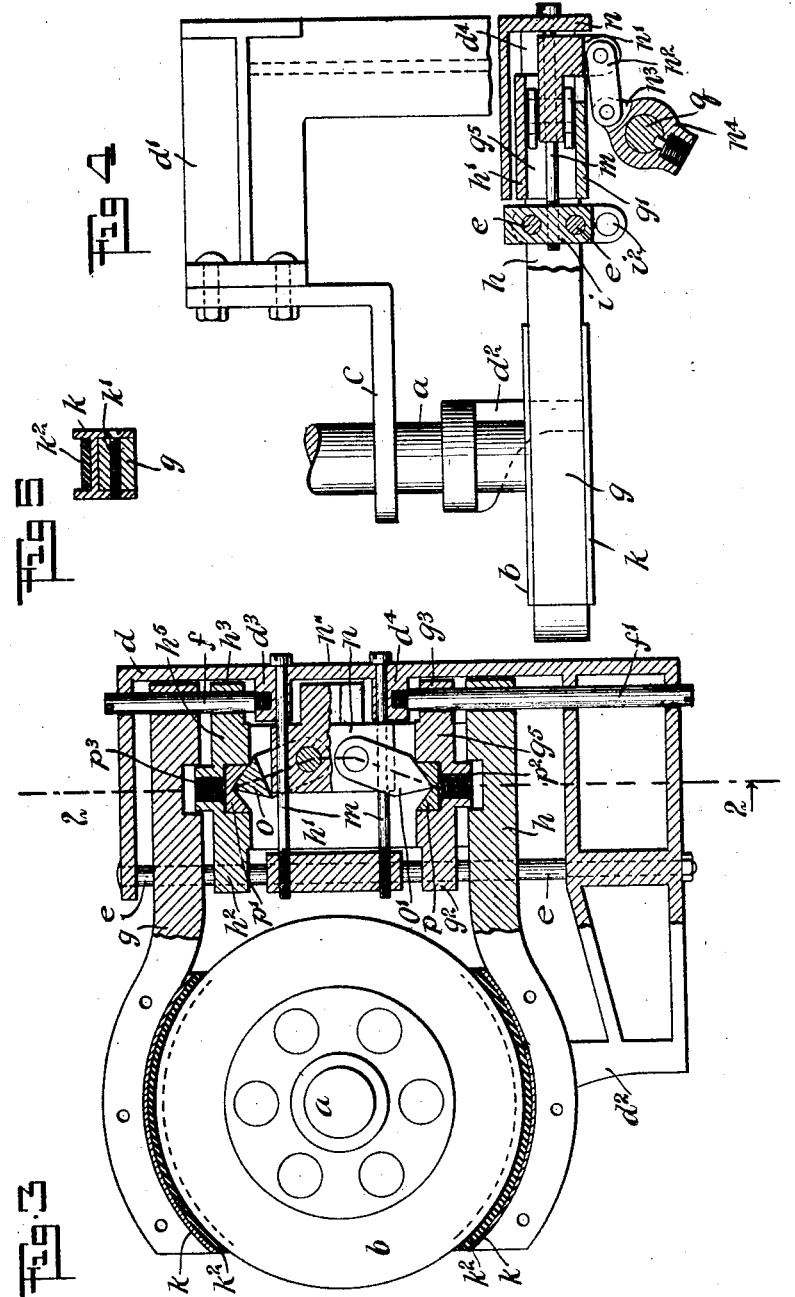

HENRY B. THOMPSON, OF NEW YORK, N. Y., ASSIGNOR TO LYDIA B. KOCH, OF NEW YORK, N. Y.

CINEMATOGRAPHIC PROJECTOR.

1,324,481.   Specification of Letters Patent.   Patented Dec. 9, 1919.

Application filed October 17, 1917. Serial No. 196,993.

*To all whom it may concern:*

Be it known that I, HENRY B. THOMPSON, a citizen of the United States, residing at the borough of Manhattan, city, county, and State of New York, have invented certain new and useful Improvements in Cinematographic Projectors, of which the following is a specification, reference being had therein to the accompanying drawings, which form a part thereof.

My invention relates to cinematographic projectors, and more particularly to a stop mechanism controlling the film movement of the projector used in connection with a cinematographic target structure in a manner to convert a moving image projected upon the screen, to a fixed image, substantially simultaneously with the impact of a bullet with said screen.

Heretofore, it has been the usual practice with a target of this character, to use an electrical drive for the power shaft of the projector, and to stop this shaft either by the interruption of the current to the motor, or by using a clutch in the mechanism connecting the motor with the power shaft, and actuating this clutch mechanism mechanically or otherwise, so as to automatically disconnect the shaft from the motor. While various controlling devices have been employed to insure accuracy in the timing of the interruption of the power applied to the film feeding shaft of the projector, to insure the exposure of a complete picture at the sight opening, the moving inertia of parts of the projector mechanism and the slight interval of time elapsing between the initial and complete actuation of the mechanism for interrupting the power applied to the shaft, has resulted not only in a lack of precision in this stoppage, but in the expenditure of sufficient time to materially reduce the rapidity with which the target may be operated and in more or less inaccuracy in marking because of a tendency of two or more pictures to pass the sight opening before a full stoppage of the projector could be effected.

By means of my present invention, I am enabled to bring the projector to a full stop practically instantly with the closing of an electrical circuit, resulting from the discharge of a fire arm at the target, whether the closing of this circuit results from the impact of a bullet with a portion of the target structure, from a switch upon the fire arm, or from a mechanism actuated by the concussion following the discharge of the fire arm. A stop mechanism made in accordance with my invention is so constructed as to secure a practically instantaneous application of the maximum power exerted thereby to effect the stoppage of the main shaft of the projector, and a substantially instantaneous release of said shaft after a very brief interval, so as to permit the full power to be instantly applied to the shaft and insure a proper timing of the feeding of the film immediately thereafter.

The stop mechanism is, as to all of its details excepting the power for actuating same, mechanical throughout, the various parts being so constructed and combined as to not only compound the power for actuating the mechanism, but to reduce all movements to so small a range as to permit great rapidity in the setting, and in the release, of this mechanism. To facilitate accuracy in the assembling of the mechanism and to control the interval required to set and release same, while avoiding likelihood of interference in the operation of the projector when the mechanism is inoperative, I provide various regulating devices, which devices, however, might be dispensed with if the various parts of the mechanism be made with sufficient precision.

It being essential to adjust the film mechanism of a projector in order to properly place the picture upon the screen, I so construct a stop mechanism made in accordance with my invention that it may have movement with the film feeding mechanism without disturbing the operative relation of its parts, either as to the mechanism acting upon the film feeding mechanism, or the means for actuating same.

While a stop mechanism made in accordance with my invention acts with great rapidity there seems to be little or no resulting jar upon the operating mechanism of the projector, which is due probably to the fact that the power required to actuate the projector is very small and the portion of the stop mechanism coöperating with the fly wheel or other member carried by the power shaft is provided with a fibrous face or lining. This lining in addition to forming a soft gripping surface which avoids any delay in the application of the braking power, is practically noiseless. As a matter of convenience, I so construct the stop mechanism that this lining may be quickly renewed.

The invention consists in the novel features of construction and combination of parts, hereinafter set forth and described and more particularly pointed out in the claims hereto appended.

Referring to the drawings:

Figure 1 is a side elevation of a stop mechanism for cinematographic projectors, embodying my invention;

Fig. 2 is a front view thereof partly in section, the section being on the line 2—2 of Fig. 3;

Fig. 3 is a view similar to Fig. 1 with a portion of the mechanism shown in section;

Fig. 4 is a plan view thereof with a portion thereof in section, on the line 4—4 of Fig. 2; and Fig. 5 is a detail sectional view of one of the brake members.

Like letters refer to like parts throughout the several views.

In the embodiment of my invention shown in the drawings, the main power shaft of the projector is indicated at $a$, said power shaft having thereon a fly wheel $b$. The shaft $a$ is mounted in a housing $c$ carrying a film feeding mechanism, which housing is slidable vertically, to permit the proper placing of the image upon the screen. Carried by and movable with the housing $c$, and its appurtenances, is a frame $d$ having two arms, one of which $d'$ is adapted to be connected with the housing $c$, and the other of which is mounted upon the shaft $a$, an arrangement which insures not only movement of the stop mechanism with the housing $c$, but permanency in the relation of this mechanism with the fly wheel $b$. The type of projector, a fragment of which is shown in the accompanying drawings, is old and well known in this art. The fly wheel $b$ of this type of projector is susceptible of having a brake mechanism applied thereto, but if the stop mechanism be used with a machine not employing such a fly wheel, it is essential to provide the power shaft $a$ of the film feeding mechanism with a disk upon which the stop mechanism may act. By utilizing a disk member, I not only avoid delay in the stoppage and restarting of the shaft $a$, but permit said stoppage and restarting, at any point of rotation of said shaft.

Carried by the frame $d$ and operative upon the fly wheel $b$ or other disk member, is a brake mechanism and means whereby said mechanism may be automatically set practically simultaneously with the impact of a bullet with the target screen (not shown), the actuation of which mechanism will be substantially uniform under all conditions.

Carried by the frame $d$, are a pair of vertically extending guides $e$ arranged adjacent the wheel or disk $b$, and upper and lower guide rods $f$—$f'$ secured to the projections $d^3$—$d^4$ carried by said frame $d$. Slidably mounted upon the said guides, and having parallel reciprocatory movement thereon are brake arm $g$—$h$, the heads of which are disposed in close proximity to opposite portions of the periphery of the wheel or disk. The arm $g$, adjacent one end thereof, is mounted directly upon the guides $e$ and toward the other end thereof, upon the guide $f$. Said arm $g$ is provided at one side thereof with an extension $g'$ having bearing bosses $g^2$—$g^3$ mounted respectively upon the guides $e$ and the guide $f'$. The arm $h$ is similarly mounted upon the guides $e$ and the guide $f'$ and is provided at one side thereof, with an extension $h'$ extending parallel with and spaced away from the extension $g'$. The extension $h'$ has bearing bosses $h^2$—$h^3$, mounted respectively upon the guides $e$ and $f$.

The guides $e$ have permanently secured thereto, a fitting $i$ having upon one side thereof projecting spring seats $i'$—$i^2$ between which and lugs $g^4$ upon the brake arms $g$, and $h^4$ upon the brake arm $h$, springs $j$—$j'$ are seated. These springs have a normal tendency to force the brake arms $g$ and $h$ away from each other and hold the brake shoe carried thereby, out of operative relation to the wheel or disk $b$. By this construction, the arms $g$ and $h$ may be brought toward each other by a suitable actuating mechanism, against the tension of the springs $j$—$j'$, the energy stored in these springs automatically releasing the wheel or disk $b$ when said actuating mechanism is released, with the incidental restoration of said actuating mechanism to normal.

Each of the brake arms $g$ and $h$ is provided with a detachable brake shoe consisting of a segmental channeled member $k$ adapted to be detachably secured to the brake arm by means of screws $k'$ or in any other desired manner; each of said brake shoes being provided with a fibrous lining, or friction facing $k^2$ adapted to act with the desired rapidity upon the wheel or disk $b$.

By providing brake arms having parallel movement in opposite directions and setting the brake shoes with the lining or facing thereon in close proximity to said wheel or disk, I secure the application of the maximum braking action upon said wheel or disk with a very short movement of the arms $g$ and $h$ and secure a clutching action which has been found to bring the wheel or disk $b$ to a complete stop without such slippage as would tend to interfere with the timing of the stoppage and re-starting of the projector.

The end of the extension $g'$ is provided with a projection $g^5$ extending into close proximity to the extension $g'$ adjacent the arm $h$, and the extension $h'$ is provided with a similar projection $h^5$ projecting into close proximity to the corresponding portion of the extension $g'$, thus forming an inclosed housing between the said brake arms adapted to receive the actuating mechanism for said arms.

Carried by the projections $d^3$—$d^4$ and by the fitting $i$ are horizontally extending guides $m$ extending through the housing so formed. Mounted upon said guides is a reciprocatory block $n$ having pivotally mounted thereon toggle levers $o$—$o'$ adapted respectively to act upon the projections $h^5$—$g^5$ to draw the said arms $g$—$h$ toward each other. The said levers $o$—$o'$ are preferably bifurcated, as shown, so as to straddle the block $n$ and are provided with a beveled end affording a narrow edge bearing thereon. To permit adjustment between the said levers and the said extensions for the purpose of regulating the quantity of movement of the arms $g$—$h$, or the braking action exerted thereby, as well as the timing of the application of this braking action, I preferably provide the said extensions with recesses in which are mounted movable bearing blocks $p$—$p'$ each having a V-shaped recess therein. Said blocks are acted upon by adjusting screws $p^2$—$p^3$ respectively, the actuation of which will not vary the normal angular relation between the said levers $o$—$o'$ and their bearings in the extensions $h^5$—$g^5$, but will vary the distance of the brake shoe from the wheel or disk $b$.

The block $n$ is provided with a laterally extending projection $n'$ having pivotally connected to the end thereof, a link $n^2$, the other end of which link is pivotally connected with a crank $n^3$ upon a collar $n^4$, splined or otherwise slidably mounted upon a fixed shaft $q$, having a sliding fit in the frame $d$. By this construction, the frame $d$ is permitted to have reciprocatory movement with the housing $c$ to facilitate the placing of an image upon the screen. The shaft $q$ and the parts coöperating therewith at all times remain stationary, thus permitting the application of power to the brake arms $g$—$h$ through the toggle lever mechanism above described, under the same condition irrespective of the adjustment of the housing $c$. The shaft $q$ is arranged at one side of the brake arm structure to allow a clear field for this mechanism, as well as for the actuating mechanism.

Said shaft $q$ is provided with a crank $q'$ pivotally connected with a lever $q^2$ which is adapted to be actuated by a bell crank lever $q^3$ connected in any desired manner with a suitable device operated as the result of the discharge of a fire arm, when the target is in use. If desired, a restoring spring $q^4$ acting upon the bell crank lever $q^3$ may be used to assist in restoring the actuating levers to normal, and assist the springs $j$—$j'$ to separate the arms $g$—$h$ and relieve the friction upon the wheel or disk $b$.

The bell crank lever $q^3$, the crank arm $q'$ and the crank $n^3$ may be so proportioned as to secure the desired compounding of the actuating energy applied to the bell crank lever. In this manner it is possible to combine great rapidity of action of the toggle lever, and the development of any desired braking action upon the wheel or disk $b$.

The operation of the herein described mechanism is substantially as follows:—

When the projector is in operation and a moving image is being projected upon the screen, the brake shoes $k$ will be positioned slightly away from the wheel or disk $b$ so as to permit the free rotation of the shaft $a$ and avoid interference by the stop mechanism with the movement of the film.

With the discharge of a fire arm at the target, certain mechanisms, which may be either mechanical or electrical, are so actuated as to apply power to one arm of the bell crank lever $q^3$ with a resultant oscillatory movement of the shaft $q$ and the collar $n^4$ carried thereby. The oscillation of the collar $n^4$ will, through the crank arm $n^3$ and link $n^2$, impart a reciprocatory movement to the block $n$ carrying the toggle levers $o$—$o'$, the first movement of said block being toward the wheel or disk $b$.

This movement of the block $n$ will cause the lever $o$ to force the projection $h^5$ toward the arm $g$, and the lever $o'$ to force the projection $g^5$ toward the arm $h$, thus simultaneously drawing the two arms $g$—$h$ toward each other and bringing the lining or friction surface $k^2$ upon said arms respectively, throughout the entire area thereof, into engagement with the periphery of the wheel or disk $b$. The movement required to develop the necessary braking or clutching action, is very small and the arrangement described will develop the maximum braking capacity substantially instantly.

By means of the screws $p^2$—$p^3$, the projections $h^5$—$g^5$ may be moved in relation to the block $n$ in a manner to increase or decrease the space between each of the brake shoes and the periphery of said wheel or disk. By forcing the blocks $p$—$p'$ toward the block $n$, the quantity of movement required to set the brake is reduced, and the length of time required to set the brake is also reduced proportionately, thus causing the maximum braking action to be more rapidly developed, as well as quickening the initial setting of the brake shoes. If, however, said blocks $p$—$p'$ be permitted to have movement away from the said block $n$ the maximum braking action will be reduced and the initial application thereof will be slightly delayed. Hence, by means of the screws $p^2$—$p^3$ and the movable bearing blocks $p$—$p'$, the braking mechanism may be set to a nicety.

By having the blocks $p$—$p'$ detachable from the projections $h^5$—$g^5$, these blocks may be renewed when worn and new bearing blocks substituted therefor.

The various guides $e$—$f$—$f'$ will insure parallel movement of the arms $g$—$h$ and avoid any possible side deflection thereof, which might vary the braking action upon the wheel or disk $b$.

The movement of the arms $g$—$h$ in setting the stop mechanism is against the tensions of the springs $j$—$j'$ so that immediately upon the release of the actuating power from the bell crank lever $q^3$, said springs will separate the arms $g$—$h$ and relieve the braking action of the shoes carried thereby, upon the wheel or disk $b$. While this spring action might be relied upon solely to restore the block $n$ to its normal position, through the levers $o$—$o'$, the action of said springs, as heretofore stated, may be supplemented by the spring $q^4$ if desired.

By splining the collar $n^4$ upon the shaft $q$ the entire braking mechanism carried by the frame $d$ may be moved with the film actuating mechanism in placing the picture upon the screen without disturbing the operative relation of the braking mechanism and the primary source of power for actuating same.

When the actuating mechanism for the arms $g$—$h$ has been set by means of the screws $p^2$—$p^3$ successive braking actions will be uniform, since there can be no loss of this adjustment except as the result of wear of parts which is not appreciable.

A stop mechanism made in accordance with my invention will act substantially instantaneously upon the film feeding mechanism so as to permit accuracy in the timing of the stoppage of the projector, thus permitting the projector to be stopped with a full picture exposed at the sight opening thereof. This timing of the stoppage of the projector is controlled by other mechanisms of the target forming no part of the present invention, it being merely necessary to secure accuracy in the stoppage of the main power shaft $a$ of the projector in order to synchronize the stop mechanism with the controlling mechanism. Heretofore difficulty has been experienced by reason of multiplication of the error due to imperfect stoppage of the projector as the result of numerous, frequent stoppages thereof. It has been found in practice, however, that the error with a stop mechanism like that herein shown and described, is practically absent so that a projector may be used for long intervals or during the exposure of an entire film without likelihood of the picture presented at the sight opening upon any stoppages of the projector, being improperly positioned.

By using a brake shoe of the character herein described, it is possible to renew the brake shoe quickly in the event of wear, although the absence of slippage between the shoe and the wheel or disk $b$ upon the application of the braking power eliminates any substantial wear upon this shoe.

By making the levers $o$—$o'$ bifurcated, as described, the engagement of the head of these levers with the block $n$ will resist the action of the springs $j$—$j'$ and define a normal angular relation of said levers, with their respective arms $h^5$—$g^5$.

The short movement of the block $n$ and the compounding of the leverages herein referred to, permits the desired rapidity in the setting of the brake shoe and in the release of the braking action, thus permitting great rapidity in the actuation of the target in its entirety. This rapidity of action is of great importance where bullets impact with the screen in rapid succession and the intervals of time between different pictures passing the sight opening are measured by a small fraction of a second.

Having described the invention what I claim as new and desire to have protected by Letters Patent is:—

1. A cinematographic projector embodying therein a stop mechanism comprising two friction brake members mounted adjacent the film feeding mechanism of a projector, a disk rotating with a shaft of said film feeding mechanism, said brake members being normally out of the operative relation to, but adapted to act upon opposite portions of the periphery of said disk, and means simultaneously operative upon both of said brake members whereby said members may be set upon said disk.

2. A cinematographic projector embodying therein a stop mechanism comprising a reciprocatory friction brake member having rectilineal movement mounted adjacent the film feeding mechanism of a projector, a disk rotating with a shaft of said film feeding mechanism, said brake member being normally out of the operative relation to, but adapted to act upon said disk, and means adapted to set said brake member upon said disk.

3. A cinematographic projector embodying therein a stop mechanism comprising two reciprocatory friction brake members having simultaneous movement in opposite directions, mounted adjacent the film feeding mechanism of a projector, a disk rotating with a shaft of said film feeding mechanism, said brake members being normally out of the operative relation to, but adapted to act upon opposite portions of the periphery of said disk, and means simultaneously operative upon both of said brake members whereby said members may be set upon said disk.

4. A cinematographic projector embodying therein a stop mechanism comprising a reciprocatory friction brake member having rectilineal movement mounted adjacent the film feeding mechanism of a projector, a disk rotating with a shaft of said film feeding mechanism, said brake member being normally out of the operative relation to, but adapted to act upon said disk, a toggle lever mechanism operative upon said brake member, and means adapted to actuate said lever mechanism to set said brake member.

5. A cinematographic projector embodying therein a stop mechanism comprising two friction brake members mounted adjacent the film feeding mechanism of a projector, a disk rotating with a shaft of said film feeding mechanism, said brake members being normally out of the operative relation to, but adapted to act upon opposite portions of the periphery of said disk, a toggle lever mechanism acting simultaneously upon both of said brake members, and means adapted to actuate said toggle lever mechanism to simultaneously set both of said brake members upon said toggle lever.

6. A cinematographic projector embodying therein a frame having parallel guides therein, a friction brake member mounted upon said guides, guides carried by said frame extending substantially perpendicularly to said first named guides, a reciprocatory block mounted upon said last named guides, toggle levers carried by said block acting upon said brake member, means whereby said block may be reciprocated, in combination with a film feeding mechanism for the projector, and a disk rotating with one of the shafts of said mechanism, said brake member being normally out of the operative relation to, but adapted to act upon, said disk when said block is reciprocated.

7. A cinematographic projector embodying therein a frame having parallel guides therein, a plurality of oppositely disposed friction brake members mounted upon said guides, guides carried by said frame extending substantially perpendicularly to said first named guides, a reciprocatory block mounted upon said last named guides, toggle levers carried by said block acting simultaneously upon said brake members, means whereby said block may be reciprocated, in combination with a film feeding mechanism for the projector, and a disk rotating with one of the shafts of said mechanism, said brake member being normally out of the operative relation to, but adapted to act upon, said disk when said block is reciprocated.

8. A cinematographic projector embodying therein a stop mechanism comprising a reciprocatory friction brake member having rectilineal movement mounted adjacent the film feeding mechanism of a projector, a disk rotating with a shaft of said film feeding mechanism, said brake member being normally out of the operative relation to, but adapted to act upon said disk, means adapted to set said brake member upon said disk, and means whereby the operative moment and interval of said brake member may be regulated.

9. A cinematographic projector embodying therein two friction brake members mounted adjacent the film feeding mechanism of a projector, a disk rotating with a shaft of said film feeding mechanism, said brake members being normally out of the operative relation to but adapted to act upon portions of the periphery of said disk, an extension at one side of each of said brake members projecting toward the other member, a projection carried by each of said extensions terminating adjacent the other extension, a reciprocatory block within said members, said extensions and said projections, toggle levers carried by said block and operative upon said projections respectively, and means whereby said block may be reciprocated.

10. A cinematographic projector embodying therein two friction brake members mounted adjacent the film feeding mechanism of a projector, a disk rotating with a shaft of said film feeding mechanism, said brake members being normally out of the operative relation to but adapted to act upon portions of the periphery of said disk, an extension at one side of each of said brake members projecting toward the other member, a projection carried by each of said extensions terminating adjacent the other extension, adjustable bearing members carried by said projections respectively, a reciprocatory block within said members, said extensions and said projections, toggle levers carried by said block and coöperating with said adjustable bearing members respectively, and means whereby said block may be reciprocated.

11. A cinematographic projector embodying therein a stop mechanism comprising two friction brake members mounted adjacent the film feeding mechanism of a projector, a disk rotating with a shaft of said film feeding mechanism, a frame, guides carried by said frame upon which said brake members are mounted, a stationary block carried by one of said guides having spring seats thereon, said brake members respectively having spring seats thereon oppositely disposed as to the spring seats upon said stationary block, springs acting upon said block and said members respectively, whereby said brake members are normally positioned out of the operative relation to said disk, and means adapted to draw said brake members together against the tension of said springs to set them simultaneously upon said disk.

12. A cinematographic projector embodying therein a stop mechanism comprising a reciprocatory friction brake member having rectilineal movement mounted adjacent the film feeding mechanism of a projector, a disk rotating with a shaft of said film feeding mechanism, said brake member being normally out of the operative relation to, but adapted to act upon said disk, said brake member embodying therein a channeled segmental brake shoe removably mounted upon said brake member, said brake shoe having a friction surface or lining, and means adapted to set said brake member upon said disk.

13. A cinematographic projector embodying therein a frame carried by and movable with the housing for the film feeding mechanism of the projector, a disk rotating with a shaft of said film feeding mechanism, an oscillatory shaft having a fixed relation to said housing, a friction brake member mounted in said frame normally out of the operative relation to, but adapted to act upon said disk, means carried by said frame adapted to set said brake member upon said disk, a member slidably mounted upon said shaft, and operative connections between said member and said means.

14. A cinematographic projector embodying therein a frame carried by and movable with the housing for the film feeding mechanism of the projector, a disk rotating with a shaft of said film feeding mechanism, an oscillatory shaft having a fixed relation to said housing, two friction brake members mounted in said frame adjacent opposite portions of the periphery of said disk, said brake members being normally out of the operative relation to said disk, means carried by said frame adapted to simultaneously actuate both of said members, whereby said members may be set upon said disk, a member slidably mounted upon said shaft, and operative connections between said member and said means.

15. A cinematographic projector embodying therein a stop mechanism comprising a frame carried by and movable with the housing for the film feeding mechanism of the projector, a disk rotating with a shaft of said film feeding mechanism, an oscillatory shaft having a fixed relation to said housing, two brake members mounted in said frame adjacent opposite portions of the periphery of said disk, said brake members being normally out of the operative relation to said disk, an extension at one side of each of said brake members projecting toward the other member, a projection carried by each of said extensions terminating adjacent the other extension, a reciprocatory block carried by said frame within said members, said extensions and said projections, toggle levers carried by said block and operative upon said projections respectively, a member slidably mounted upon said shaft, connections between said last named member and said block, and means adapted to oscillate said fixed shaft.

16. A cinematographic projector embodying therein a stop mechanism comprising a reciprocatory friction brake member having rectilineal movement mounted adjacent the film feeding mechanism of the projector, a disk rotating with a shaft of said film feeding mechanism, said brake member being normally out of the operative relation to, but adapted to act upon said disk, and a compound lever system adapted to set said brake members upon said disk.

In witness whereof, I hereunto affix my signature in the presence of two subscribing witnesses, this 29th day of September, 1917.

HENRY B. THOMPSON.

Witnesses:
BERTHA MUELLER,
CLARICE FRANK.